(12) United States Patent
Breinlinger

(10) Patent No.: US 7,061,926 B2
(45) Date of Patent: Jun. 13, 2006

(54) METHOD AND APPARATUS FOR A NETWORK BUS TOPOLOGY

(75) Inventor: Richard H. Breinlinger, Hampstead, NH (US)

(73) Assignee: Schneider Automation Inc., North Andover, MA (US)

( * ) Notice: Subject to any disclaimer, the term of this patent is extended or adjusted under 35 U.S.C. 154(b) by 1090 days.

(21) Appl. No.: 09/927,854

(22) Filed: Aug. 10, 2001

(65) Prior Publication Data

US 2002/0041601 A1    Apr. 11, 2002

Related U.S. Application Data

(63) Continuation-in-part of application No. 09/595,162, filed on Jun. 15, 2000.

(51) Int. Cl.
*H04L 12/56* (2006.01)

(52) U.S. Cl. .................. 370/403; 370/402; 370/244
(58) Field of Classification Search ........ 370/216–228, 370/242–245, 249, 447, 449, 229, 230, 254–259, 370/270, 400, 401–406, 412, 423
See application file for complete search history.

(56) References Cited

U.S. PATENT DOCUMENTS

| | | | |
|---|---|---|---|
| 4,674,085 A | | 6/1987 | Aranguren et al. |
| 5,799,040 A | | 8/1998 | Lau |
| 6,147,967 A | * | 11/2000 | Ying et al. .................. 370/222 |
| 6,744,779 B1 | * | 6/2004 | Yamaguchi et al. ........ 370/449 |

FOREIGN PATENT DOCUMENTS

| WO | WO 94/08305 | 4/1994 |
|---|---|---|
| WO | WO 98/30961 | 7/1998 |

OTHER PUBLICATIONS

Communication from the European Patent Office Including International Search Report from WO 03/015348, mailed May 30, 2003.

Kubota, Y, et al., NTT Human Interface Laboratories, "Proposal of the Robot System With Information Sending Mechanism," Presented at the 14th Annual Conference of the Robotics Society of Japan, Nov. 1-3, 1996, pp. 341-342. (In Japanese w/English translation included).

Picon, Gerard, Schneider Automation, "Java and Programmable Automation Controllers." *CiMax: Edition Terrain*, No. 13—May/Jun. 1997 (in Frech w/ English translation included).

Brugger, Peter, "Web Technology in Embedded Computing." *Industrial Computer 97—Special Edition:* Sep. 3, 1997 (in German w/ English translation included).

(Continued)

*Primary Examiner*—Dang Ton
*Assistant Examiner*—Phuc Tran

(57) ABSTRACT

A method and a system is provided for facilitating communication throughout a master/slave network. The network topology includes a transmission cable being operably connected between the network modules. A master module includes a master terminating resistor operably connected to the transmission cable. A slave module includes a slave terminating resistor and a slave switch. The slave terminating resistor is operably connected to the slave switch. A load resistor is operably connected to the transmission cable. The slave switch is operably responsive to the load resistor to generate a terminate enable. The slave switch inserts the slave terminating resistor onto the transmission cable in response to the terminate enable.

17 Claims, 2 Drawing Sheets

OTHER PUBLICATIONS

Williams, Tom, et al., "Java Goes to Work Controlling Networked Embedded Systems," *Computer Design,* Aug., 1996, pp. 36.

Fu, K.S., et al., *Robotics: Control, Sensing, Vision and Intelligence,* Chapter Five: Control of Robot Manipulators: Sections 5.1-5.3.1.

*Automation Strategies,* by Automation Research Corporation, Feb. 1998, pp. 1-32.

Lecuivre, J., et al., *A framework for validating distributed real time applications by performance evaluation of communication profiles.* Factory Communication Systems, 1995, WFCS '95, Proceedings, 1995 IEEE International Workshop on Leysin, Switzerland Oct. 4-6, 1995, New York, NY, pp. 37-46.

*Modicon Modbus Protocol Reference Guide,* Modicon, Inc., Jun. 1996, pp. 1-12.

Swales, Andy, *Topology Considerations for Modbus/Therenet Automation Networks,* Law Controls, Inc., Jan. 25, 2000.

Beaupre, Jacques, et al., *Advanced Monitoring Technologies for Substations.* IEEE, Oct. 9, 2000, pp. 287-292.

Mostafa, W., et al., *A Taxonomy of Multicast Protocols for Internet Applications,* Computer Communications, Elsevier Science Publishers BV, Amsterdam, NL, vol., 20, No. 16, 1998, pp. 1448-1457.

Preston, David J., Internet Protocols Migrate to Silicon for Networking Devices, *Electronic Design,* vol. 45, No. 8, Apr. 14, 1997, pp. 87-90.

Klesper, Tilo, "Der Internet-Zugriff Aufs Lon Weltweiter Zugriff Auf Die Sensorik Und Aktorik Von Automatisierungs-Projekten". *Elecktronick,* vol. 47, No. 8, Apr. 14, 1998, pp. 60, 62, 64, 66.

\* cited by examiner

METHOD AND APPARATUS FOR A NETWORK BUS TOPOLOGY

RELATED APPLICATIONS

This patent application is a continuation-in-part, claims priority of, and incorporates by reference, U.S. Patent Application entitled, "Method And Apparatus For Electrically Terminating A Transmission Bus For A Communication Network," Ser. No. 09/595,162, filed Jun. 15, 2000.

TECHNICAL FIELD

This invention relates generally to the field of communication networks and more particularly to a system for reducing network cabling and installation cost by providing an auto-terminated bus topology between nodes of the network.

BACKGROUND OF THE INVENTION

Communication networks are an integral part of everyday life. A variety of tasks, both complex and mundane, are effectively and quietly monitored and controlled by computer networks without requiring constant human interaction. Networks can interconnect several devices or modules for controlling and monitoring an environment, process or task. The devices and/or modules can be linked together via a communication cable. These devices include, computers, programmable logic controllers, sensors, gauges, monitors, display terminals, valves, motors, machinery, alarms, etc.

As networks become more reliable, society becomes more dependent on them. Ironically, the more dependent society becomes on networks, the more difficult it is to manage everyday operations when the network fails to function properly. Because the modules are interconnected, problems occurring with one module or section of the network can affect other parts of the network.

Network modules communicate with each other via a communication bus, e.g., Ethernet. Ethernet networks encompass a variety of network structures or topologies, i.e., bus, star, as well as utilizing different types of transmission cabling, i.e., co-axial cable, twisted-pair and unshielded twisted-pair lines. Network problems can occur through the failure or removal of an individual module, device or sub-network in the network. If the bus is severed or if a network module is removed or replaced, the electrical characteristics of the bus are affected; namely, the electrical impedance characteristics of the transmission bus throughout the network. When the impedance characteristic of the bus is not matched within the network, the communication signals are adversely affected and the signal transmission can be corrupted.

To combat network problems, Ethernet networks are often configured in a star topology. FIG. 1. The star topology resolves network disruptions caused by removal of a network module or separation of the communication cable by providing for the disruption to affect only the specific branch of the communication cable. Although the star topology is beneficial, additional cabling and network devices, e.g., hubs, are required. The additional equipment increases the overall cost and complexity of the network.

This invention is directed to solving these and other problems.

SUMMARY OF THE INVENTION

The present invention provides a topology for a master/slave communication network for responding to breakdowns in communication throughout the network, most notably, disconnected network modules or severed cabling.

In one aspect of the present invention, a topology is provided for facilitating communication throughout a network. The network topology comprises a transmission cable including a transmit twisted-wire pair, a receive twisted-wire pair, and a sense cable. A master module includes a master transmit terminating resistor and a master receive terminating resistor. Both master terminating resistors are operably connected to the transmission cable. A slave module includes a slave receive terminating resistor and a slave receive switch. The slave receive terminating resistor is operably connected to the slave receive switch wherein the master transmit terminating resistor and the slave receive terminating resistor are operably connected to the transmit twisted-wire pair. A load resistor is operably connected to the sense cable. The slave receive switch is operably responsive to the load resistor to generate a receive terminate enable. The slave receive switch inserts the slave receive terminating resistor onto the transmit twisted-wire pair of the transmission cable in response to the receive terminate enable.

A further aspect of the present invention is directed to the slave module further comprising a slave transmit terminating resistor and a slave transmit switch. The slave transmit terminating resistor and slave transmit switch are operably connected to the receive twisted-wire pair and the master receive terminating resistor. The slave transmit switch is operably responsive to the load resistor to generate a transmit terminate enable. The slave transmit switch inserts the slave transmit terminating resistor onto the receive twisted-wire pair of the transmission cable in response to the transmit terminate enable.

In a method of minimizing communication signal disruptions within a master/slave network, the present invention discloses the steps of minimizing communication signal disruptions in a master/slave communication network comprising a master module, a slave module, and a transmission cable. The transmission cable is operably connected to the master and slave modules. The method comprises the steps of providing a slave receive terminating resistor being operably connected to a slave receive switch and a transmit twisted-wire pair of the transmission cable. A voltage signal on the transmission cable is sensed wherein a terminate enable is generated in response to the voltage signal. A switch is activated in response to the terminate enable wherein the slave receive terminating resistor is placed onto the twisted-wire pair for properly terminating the transmission cable.

One object of the present invention is to provide a low cost method of connecting a master device to one or more slave devices on an Ethernet 10BASE-T or 100BASE-T network without the need of a network hub or switch.

Another object of the present invention is to provide a communication network capable of quickly repairing disruptions in the communication network for the purpose of maintaining high quality communications in as much of the network as possible. The repair of the network is accomplished by electrically terminating the truncated network to reduce the resulting network disruptions within the remaining network.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention, which is not necessarily represented by such embodiment.

DETAILED DESCRIPTION OF THE DRAWINGS

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
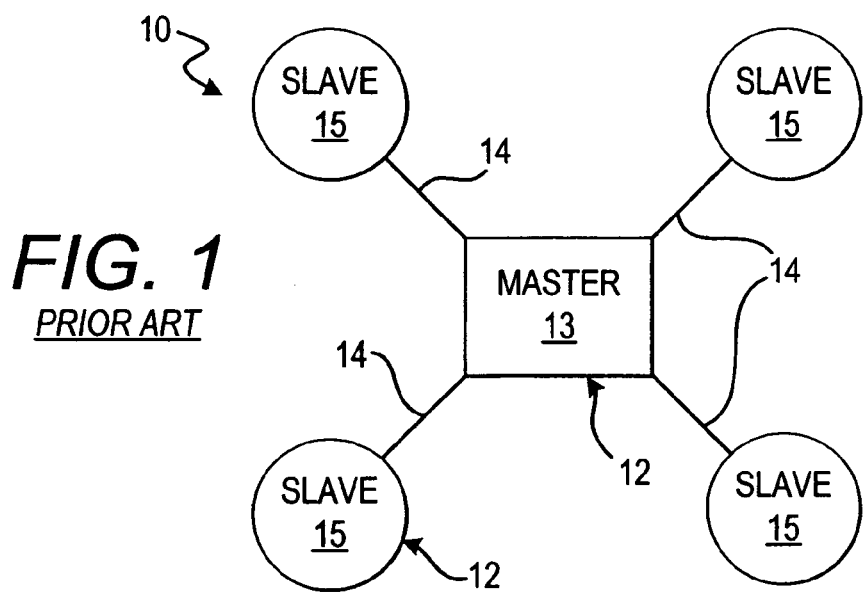
FIG. 1 is a block diagram of an Ethernet 10/100BASE-T network system configured in a star topology known in the prior art.
Figure 2:
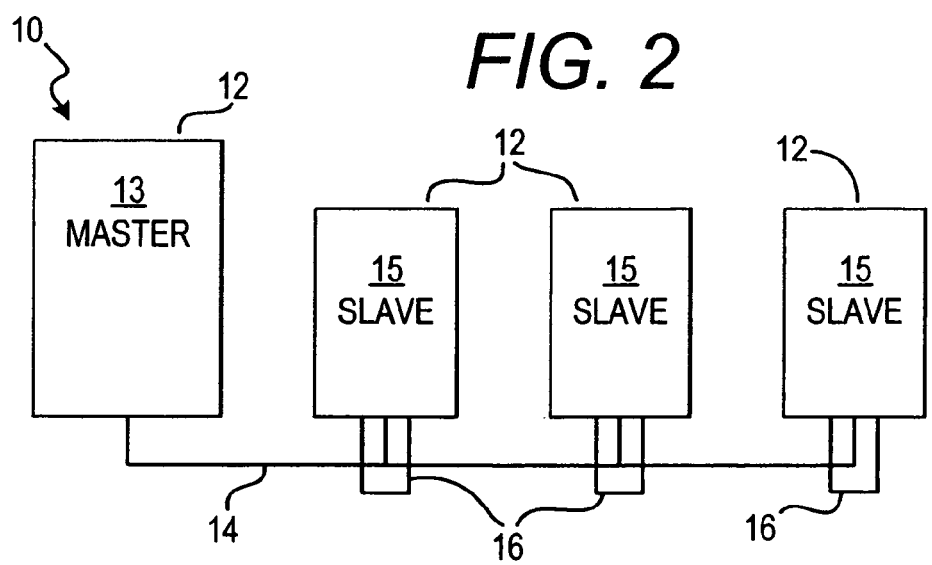
FIG. 2 shows an overview block diagram of a network system illustrating the relationship between the network devices and the communication bus according to one embodiment of the present invention.

FIG. 2 shows a master/slave communications network 10, preferably Ethernet 10BASE-T or Ethernet 100BASE-T. A plurality of network devices 12, i.e., master 13 and slave 15; are interconnected by a communication medium 14, preferably a transmission cable. The communication network 10 is configured in a serial bus topology layout, but can also be configured in various other topology layouts. A connector 16 operably connects each slave device module 15 to the communication bus 14. Electrical data and/or control signals travel on the bus 14 between the slave modules 15 and the master module 13 of the network 10.

Due to the high-speed transmission of the communication signal, the quality of the signal transmission is vulnerable to noise. Generally, a high-speed communication bus 14 is required to be properly terminated at its ends with a matching terminal impedance to ensure accurate communication throughout the network 10. An improperly terminated transmission bus 14 having unmatched terminal impedance values at its ends will allow high speed signals to reflect on the bus, causing signal disruptions.

Similar to an improperly terminated communication bus 14, the removal of a slave module 15 from the network 10 or the severing of the bus 14 will also result in reflections and disruptions of communication signals on the network 10. The removal of a slave module 15 from the network 10 may also truncate the network near the removed module. The removal of part of the network 10 can result in an improperly terminated communication bus 14 near that location, ultimately causing poor communication performance on the network.

Figure 3:
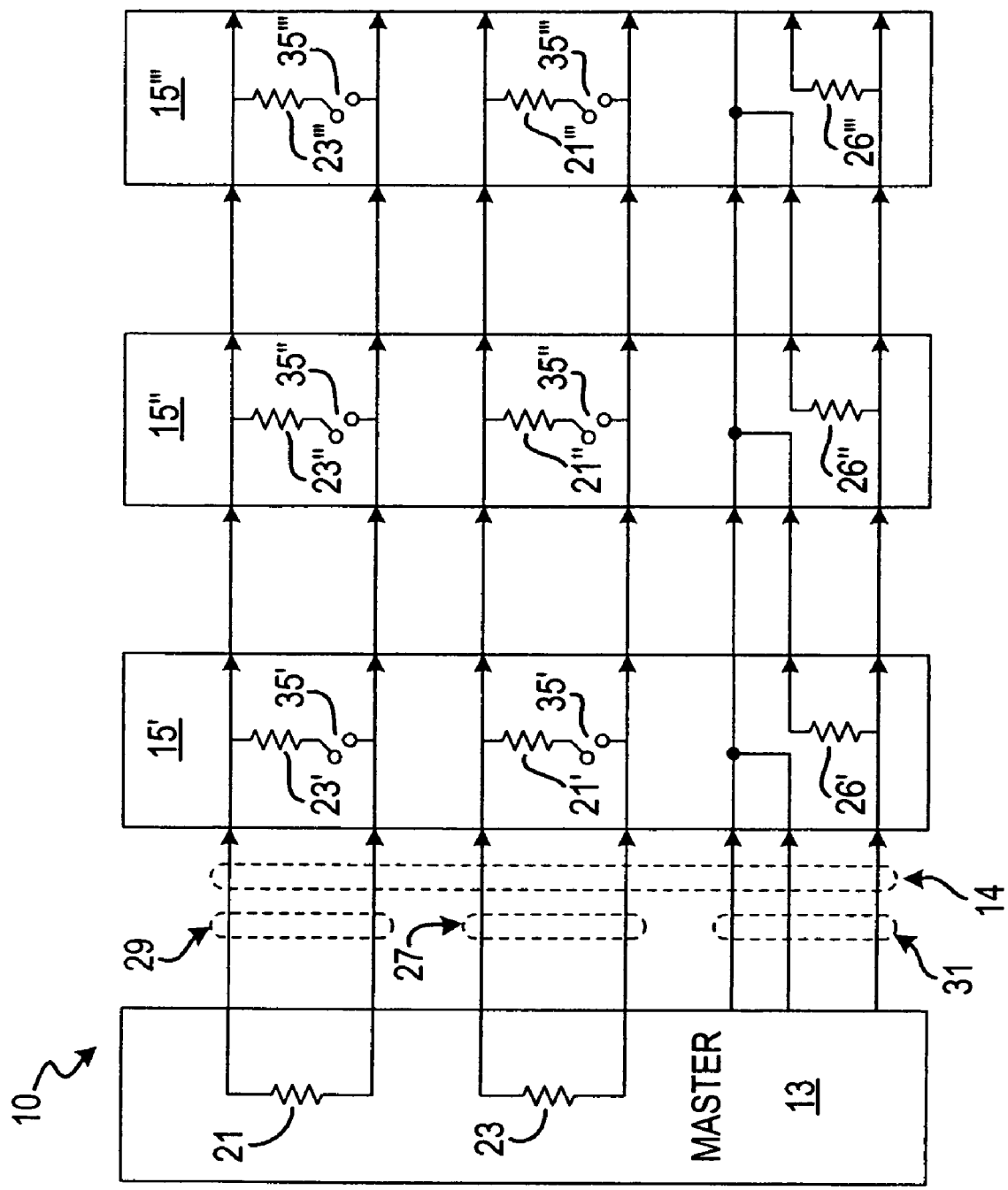
FIG. 3 is a schematic diagram illustrating the relationship between the switches, terminating resistors, network modules, and serial communication of one embodiment of the present invention; and, FIG. 4 is a block diagram showing an alternative embodiment of the invention.

FIG. 3 depicts a schematic diagram of a plurality of modules 13, 15 operably connected within a network 10. One set of terminating resistors, i.e., a master transmit terminating resistor 21 and a master receive terminating resistor 23, resides within the master device 13. Another set of terminating resistors, i.e., a slave transmit terminating resistor 21 and a slave receive terminating resistor 23, resides near the other end of the bus 14, preferably within each slave module 15', 15", 15'". A plurality of slave devices 15', 15", 15'", connectors 16, and cables 14 lie between the two ends of the network 10. The communication cable 14 comprises a transmit twisted-wire pair 29, a receive twisted-wire pair 27, and a sense cable 31. A pair of switches 33, 35 within each slave module 15', 15", 15'" are operably connected to the bus 14. The connector 16 operably connects each slave module 15', 15", 15'" to the bus 14. The switches 33, 35 are preferably electronic, but may also be electromechanical.

The switches 33, 35 are responsive to the presence of a voltage on the sense cable 31 portion of the communication bus 14 to generate a terminate enable signal. Two terminal resistors, i.e., slave transmit terminating resistor 21 and slave receive terminating resistor 23, of each slave module 15', 15", 15'" are operably connected to their respective switches 33, 35. Sensing the voltage signal on the sense cable 31 portion of the communication bus 14 generates a terminate enable signal. In response to the terminate enable, the switches 33, 35 insert the matching slave terminating resistors 21, 23 onto the bus 14 near the slave module 15 nearest the newly created end of a severed communication bus 14. Terminating the newly created end of the bus 14 with a pair of matching impedance terminating resistors 21, 23 will maintain the quality of signal communications in the remaining operable network.

A portion of the network 10 may be disconnected through error or design. For instance, the transmission cable 14 can be cut or the slave module 15 can be removed from the network 10. When either of these situations occur, the nearest operable slave module's switches 33, 35 respond by sensing the discontinuation in the communication cable 14 and inserting the slave terminating resistor 21, 23 with an appropriate value at that point in the network 10. Thus, the network 10 is automatically "terminated" nearest the point of discontinuity within the network 10, thus keeping the largest possible amount of remaining network in operable use.

Each module 15 has a set of switches 33, 35 operably connected to a slave terminating resistor 21, 23, respectively. The switches 33, 35 are preferably solid state devices, but may be an electromechanical coil with the relay replaced. The switches 33, 35 and terminating resistors 21, 23 of the network 10 can be replaced with electromechanical relays having a coil in place of the load resistor 26 and the normally closed contacts replacing the switches. Multiple solid-state switches can also be placed in parallel to lower the "on" resistance of the switch.

A voltage signal flows via the sense cable 31 to each slave module 15', 15", and 15'" on the network 10. If the voltage is not sensed by the slave module's switch 33, 35, i.e., the voltage at the load resistor 26 is zero, the switches 33, 35 are closed and the respective module's 15 switch 33, 35 will insert the respective terminating resistor 21, 23 into the network 10 at that location on the bus 14. Thus, the network 10 is properly terminated at its farthest operable point on the bus 14. Preferably, the value of the terminating resistance matches the characteristic impedance of the network cable bus 14. For Ethernet bus systems, the characteristic impedance is approximately 100 ohms, but other cable system may require different impedance values to properly terminate the network. Conversely, if a voltage is sensed at the load resistor 26, i.e., the voltage at the load resistor is not zero, the switches 33, 35 are open. It is to be understood that one of ordinary skill in the art could easily substitute normally opened switches for normally closed switches and normally closed switches for normally opened ones.

For example, if the voltage across the load resistor 26''' for the third module 15''' is 0 volts, the third module's switches 33''', 35''' will be closed and the terminating resistors 21''', 23''' of the third module will be inserted into the network 10, as desired. As another example, if either the third module 15''' or the bus 14 between the second 15'' and third module 15''' is disconnected, the voltage at the load resistor 26'' of the second module 15'' will be 0 volts. The switches 33'', 35'' of the second module 15'' will respond to the lack of voltage on the sense cable 31 near the load resistor 26'' of the communication bus 14 and close the switches 33'', 35'' of the second module 15'', thus inserting the terminating resistors 21'', 23'' of the second module 15'' onto the transmit twisted-wire pair 29 and receive twisted-wire pair 27 of the bus 16 and properly terminating the network 10 at the farthest possible location within the remaining operable network. Thus, communication disruptions caused by the removal of part of the network, or device 15 thereon, are minimized by the auto-terminate scheme.

Figure 4:
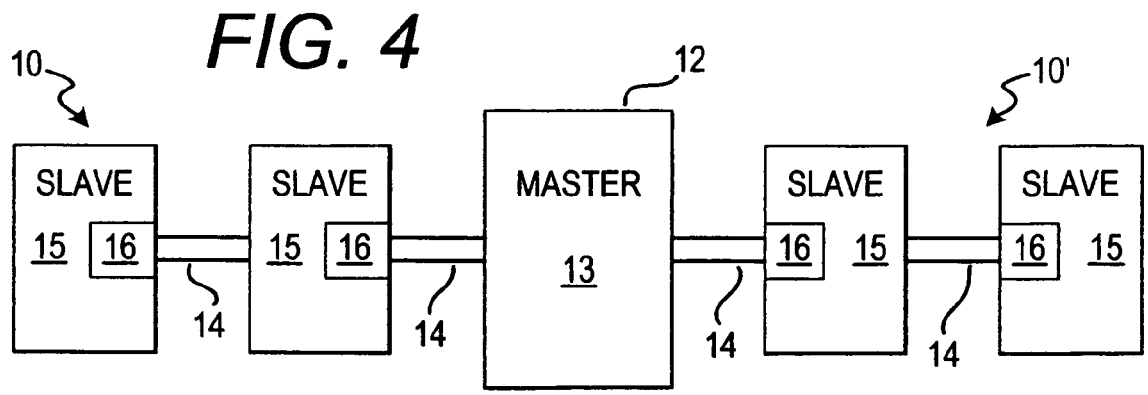

The present invention can also be implemented to work with "two-sided" networks as well. FIG. 4. The master module 13 includes two sets of terminating resistor pairs, i.e., a transmit terminating resistor 21 and a receive terminating resistor 23. Essentially, the master module 13 functions with two networks 10, 10' of slave modules 15. A discontinuation of the communication bus 14 on either network 10, 10' is sensed by the nearest adjacent switches 33, 35 and a terminal resistor 21, 23 from the nearest operable adjacent slave module 15 will be inserted onto the communication bus 14 to terminate the affected network 10, 10'. The terminating resistor 21, 23 providing the matching impedance for reducing the adverse affects of signal reflections resulting from an improperly terminated network.

While the specific embodiments have been illustrated and described, numerous modifications are possible without departing from the scope or spirit of the invention.

I claim:

1. A network bus topology for a master/slave communication network comprising:
    a transmission cable including a transmit twisted-wire pair, a receive twisted-wire pair, and a sense cable;
    a master module including a master transmit terminating resistor and a master receive terminating resistor, both master terminating resistors being operably connected to the transmission cable;
    a slave module including a slave receive terminating resistor and a slave receive switch, the slave receive terminating resistor being operably connected to the slave receive switch wherein the master transmit terminating resistor and the slave receive terminating resistor being operably connected to the transmit twisted-wire; and,
    a load resistor being operably connected to the sense cable, the slave receive switch being operably responsive to the load resistor to generate a receive terminate enable wherein the slave receive switch inserts the slave receive terminating resistor onto the transmit twisted-wire pair of the transmission cable in response to the receive terminate enable.

2. The network bus topology of claim 1 wherein the slave module further comprises:
    a slave transmit terminating resistor; and,
    a slave transmit switch, the slave transmit terminating resistor being operably connected to the slave transmit switch, the master receive terminating resistor and the receive twisted-wire pair,
    the slave transmit switch being operably responsive to the load resistor to generate a transmit terminate enable wherein the slave transmit switch inserts the slave transmit terminating resistor onto the receive twisted-wire pair of the transmission cable in response to the transmit terminate enable.

3. The network bus topology of claim 1 wherein the transmission cable is Ethernet 10BASE-T.

4. The network bus topology of claim 1 wherein the transmission cable is Ethernet 100BASE-T.

5. The network bus topology of claim 1 wherein the slave transmit switch and the slave receive switch are electronic.

6. The network bus topology of claim 1 wherein the slave receive terminating resistor has a value equal to the value of the characteristic impedance of the network.

7. The network bus topology of claim 2 wherein the slave transmit terminating resistor has a value equal to the value of the characteristic impedance of the network.

8. A network bus topology for an Ethernet master/slave communication network comprising:
    a communication cable comprising:
        a transmit twisted-wire pair;
        a receive twisted-wire pair; and,
        a sense cable including at least three wires, the sense cable further including a load resistor being operably connected to the sense cable;
    a master module including a master transmit terminating and a master receive terminating receive, the master transmit terminating resistor being operably connected to the transmit twisted-wire pair and the master receive terminating resistor being operably connected to the receive twisted-wire pair; and,
    a slave module including a slave receive terminating resistor, a slave transmit terminating resistor, a receive switch, and a transmit switch,
    the receive switch being operably connected to the slave receive terminating resistor and the transmit twisted-wire pair,
    the transmit switch being operably connected to the slave transmit terminating resistor and the receive twisted-wire pair,
    wherein the receive and transmit switches being responsive to the load resistor to generate a receive terminate enable and a transmit terminate enable, respectively, the receive switch inserts the slave receive terminating resistor onto the transmit twisted-wire pair in response to the receive terminate enable, and
    the transmit switch inserts the slave transmit terminating resistor onto the receive twisted-wire pair in response to the transmit terminate enable.

9. The network of claim 8 wherein the master/slave communication network is 10BASE-T.

10. The network of claim 8 wherein the master/slave communication network is 100BASE-T.

11. The network of claim 9 wherein the receive terminating resistor of the slave module has a value of approximately 100 ohms.

12. The network of claim 10 wherein the receive terminating resistor of the slave module has a value of approximately 100 ohms.

13. A method of minimizing communication signal disruptions in a master/slave communication network comprising a master module, a slave module, and a transmission cable, the transmission cable being operably connected to the master and slave modules, the method comprising the steps of:

provinding a slave receive terminating resistor, the slave receive terminating resistor being operably connected to a slave receive switch and a transmit twisted-wire pair;

sensing a voltage signal on the transmission cable;

generating a terminate enable responsive to the voltage signal; and, activating the switch in response to the terminate enable wherein the slave receive terminating resistor is placed onto the transmission cable.

14. The method of claim 13 wherein the transmission cable is Ethernet 10Base-T.

15. The method of claim 13 wherein the transmission cable is Ethernet 100Base-T.

16. The method of claim 13, further comprising:

selecting a value for the slave receive terminating resistor equivalent to properly match the characteristic impedance of the network.

17. The method of claim 16 wherein the selected value is approximately 100 ohms.

* * * * *